(12) United States Patent
Wang et al.

(10) Patent No.: US 12,229,862 B2
(45) Date of Patent: Feb. 18, 2025

(54) GENERATING ANIMATED INFOGRAPHICS FROM STATIC INFOGRAPHICS

(71) Applicant: Microsoft Technology Licensing, LLC, Redmond, WA (US)

(72) Inventors: Yun Wang, Saratoga, CA (US); He Huang, Beijing (CN); Haidong Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 68 days.

(21) Appl. No.: 17/927,857

(22) PCT Filed: May 9, 2021

(86) PCT No.: PCT/US2021/031473
§ 371 (c)(1),
(2) Date: Nov. 25, 2022

(87) PCT Pub. No.: WO2022/005617
PCT Pub. Date: Jan. 6, 2022

(65) Prior Publication Data
US 2023/0206536 A1    Jun. 29, 2023

(30) Foreign Application Priority Data
Jun. 30, 2020   (CN) .................. 202010622542.8

(51) Int. Cl.
*G06T 13/80* (2011.01)
*G06V 10/77* (2022.01)

(52) U.S. Cl.
CPC .......... *G06T 13/80* (2013.01); *G06V 10/7715* (2022.01)

(58) Field of Classification Search
CPC .................. G06T 13/80; G06V 10/7715
See application file for complete search history.

(56) References Cited

U.S. PATENT DOCUMENTS

| 7,737,996 | B2 | 6/2010 | Gerhard et al. |
| 8,907,957 | B2 | 12/2014 | Gehani et al. |
| 10,198,846 | B2 | 2/2019 | Carr |
| 2008/0049025 | A1 | 2/2008 | Le |

(Continued)

FOREIGN PATENT DOCUMENTS

| CN | 102591644 A | 7/2012 |
| CN | 107833261 A | 3/2018 |

OTHER PUBLICATIONS

Communication pursuant to Article 94(3) Received for European Application No. 21730345.2, mailed on Mar. 15, 2024, 05 pages.

(Continued)

*Primary Examiner* — Michelle Chin
(74) *Attorney, Agent, or Firm* — Schwegman Lundberg & Woessner, P.A.

(57) ABSTRACT

Implementations of the subject matter described herein relate to generating animated infographics from static infographics. A computer-implemented method comprises: extracting visual elements of a static infographic; determining, based on the visual elements, a structure of the static infographic at least indicating a layout of the visual elements in the static infographic; and applying a dynamic effect to the visual elements based on the structure of the static infographic to generate an animated infographic.

19 Claims, 15 Drawing Sheets

(56) References Cited

U.S. PATENT DOCUMENTS

| | | | |
|---|---|---|---|
| 2012/0075433 A1 | 3/2012 | Tatzgern et al. | |
| 2013/0132818 A1 | 5/2013 | Anders | |
| 2015/0235397 A1* | 8/2015 | Beckman | G06T 11/206 345/440 |
| 2016/0188682 A1* | 6/2016 | Silverstein | G06F 40/143 707/803 |
| 2016/0225177 A1 | 8/2016 | Autier et al. | |
| 2017/0004646 A1* | 1/2017 | Phillipps | G06T 13/80 |
| 2018/0210864 A1 | 7/2018 | Zhang | |
| 2020/0142572 A1 | 5/2020 | Liu et al. | |

OTHER PUBLICATIONS

"4 Step Infographic Concept Slide for PowerPoint—Free PPT", Retrieved From: https://www.youtube.com/watch?v=hmApxMVNg10, Jan. 3, 2019, 3 Pages.

"4 Steps Infographic Slide in PowerPoint | Round Squares Infographics", Retrieved From: https://www.youtube.com/watch?v=Zq9TdHJa2UI, Dec. 26, 2019, 2 Pages.

"6 Options Infographic Slide in Powerpoint /Business Presentation/ Powerpoint Tutorial", Retrieved From: https://www.youtube.com/watch?v=LGC9DA2xDR4, Mar. 2, 2019, 9 Pages.

"6 Years Animated Infographic Timeline Template for PowerPoint", Retrieved From: https://www.youtube.com/watch?v=uqaiLzvSda0, Jan. 23, 2020, 3 Pages.

"9 Options Infographic Slide in PowerPoint / Animated PowerPoint Slide Design Tutorial", Retrieved From: https://www.youtube.com/watch?v=BSf-b3puhCA, Jun. 22, 2019, 3 Pages.

"Animated PowerPoint Infographic Slide Design Tutorial", Retrieved From: https://www.youtube.com/watch?v=OZKTzpbnGOA, Nov. 25, 2017, 3 Pages.

"Flourish", Retrieved From: https://web.archive.org/web/20200501021942/https:/flourish.studio, May 1, 2020, 7 Pages.

"How To Design Awesome Corporate Business Style Presentation Slide in Microsoft Office PowerPoint PPT", Retrieved From: https://www.youtube.com/watch?v=FiD5TRvIHXo, Jan. 9, 2020, 3 Pages.

"How to Design Easy and Beautiful Slide in PowerPoint—Part 2 | Balance Scale Design", Retrieved From: https://www.youtube.com/watch?v=X66-FHjZE4U, Nov. 20, 2018, 3 Pages.

"How To Make 5 Steps 3D Arrow Circle Infographic In Powerpoint | Powerpoint Show", Retrieved From: https://www.youtube.com/watch?v=PXKoy_CnK-g, Nov. 3, 2019, 3 Pages.

"How To Make A Creative 3D Pencil Infographic On Powerpoint | Powerpoint Show", Retrieved From: https://www.youtube.com/watch?v=aqaSt_61wp4, Oct. 23, 2019, 3 Pages.

"How To Make A Creative Animated Timeline On Powerpoint | Powerpoint Show", Retrieved From: https://www.youtube.com/watch?v=Un4IKT03PYo, Oct. 18, 2019, 3 Pages.

"Multipurpose Business Announcement Slide Design in PowerPoint", Retrieved From: https://www.youtube.com/watch?v=uU97IYIUtDs, Sep. 27, 2019, 3 Pages.

"PC&TC—PowerPoint Tutorial: (Simple Trick) How to Create Multiple Timeline Template", Retrieved From: https://www.youtube.com/watch?v=k4DR71pqzkw, May 7, 2018, 3 Pages.

"PowerPoint Animation Tutorial—Map Location", Retrieved From: https://www.youtube.com/watch?v=-tP7w7Jju5Y, Feb. 4, 2018, 3 Pages.

"PowerPoint Presentation Slide Animation Tutorial", Retrieved From: https://www.youtube.com/watch?v=QF9KG8QTgVI, Jan. 21, 2018, 3 Pages.

"Process Slide in PowerPoint", Retrieved From: https://www.youtube.com/watch?v=ND3WY2FSrl8, Jan. 16, 2019, 3 Pages.

"Sklearn.Ensemble.RandomForestClassifier", Retrieved From: https://web.archive.org/web/20200527032143/https:/scikit-learn.org/stable/modules/generated/sklearn.ensemble.RandomForestClassifier.html, May 27, 2020, 7 Pages.

"Timeline Infographic—Animated PowerPoint Template", Retrieved From: https://www.youtube.com/watch?v=R-gXjpNtZHs, Nov. 8, 2018, 2 Pages.

"Timeline Slide in PowerPoint", Retrieved From: https://www.youtube.com/watch?v=hdhxNqE5pKg, Oct. 11, 2019, 2 Pages.

"Timeline, Process, MileStones, Achievements, Targets, Sales, Steps, Workflow Design in PowerPoint", Retrieved From: https://www.youtube.com/watch?v=ej_uDR6qgSQ, Oct. 20, 2018, 3 Pages.

"Visme", Retrieved From: https://web.archive.org/web/20200516213011/https:/www.visme.co/, May 16, 2020, 9 Pages.

Amini, et al., "Authoring Data-Driven Videos with DataClips", In Journal of IEEE Transactions on Visualization and Computer Graphics, vol. 23, Issue 1, Aug. 10, 2016, pp. 501-510.

Amini, et al., "Hooked on Data Videos: Assessing the Effect of Animation and Pictographs on Viewer Engagement", In Proceedings of the International Conference on Advanced Visual Interfaces, May 29, 2018, 9 Pages.

Amini, et al., "Understanding Data Videos: Looking at Narrative Visualization through the Cinematography Lens", In Proceedings of the 33rd Annual ACM Conference on Human Factors in Computing Systems, Apr. 18, 2015, pp. 1459-1468.

Bach, et al., "Design Patterns for Data Comics", In Proceedings of the CHI Conference on Human Factors in Computing Systems, Apr. 21, 2018, 12 Pages.

Bach, et al., "Visualizing Dynamic Networks with Matrix Cubes", In Proceedings of CHI Conference on Human Factors in Computing Systems, Apr. 26, 2014, pp. 877-886.

Bateman, et al., "Useful Junk? The Effects of Visual Embellishment on Comprehension and Memorability of Charts", In Proceedings of the SIGCHI Conference on Human Factors in Computing Systems, Apr. 10, 2010, pp. 2573-2582.

Bezerianos, et al., "GraphDice: A System for Exploring Multivariate Social Networks", In Journal of Computer Graphics Forum, vol. 29, Issue 3, Aug. 12, 2010, pp. 863-872.

Borkin, et al., "What Makes a Visualization Memorable?", In Journal of IEEE Transactions on Visualization and Computer Graphics, vol. 19, Issue 12, Dec. 2013, pp. 2306-2315.

Bryan, et al., "Temporal Summary Images: An Approach to Narrative Visualization Via Interactive Annotation Generation and Placement", In Journal of IEEE Transactions on Visualization and Computer Graphics, vol. 23, Issue 1, Jan. 2017, pp. 511-520.

Bylinskii, et al., "Learning Visual Importance for Graphic Designs and Data Visualizations", In Proceedings of the 30th Annual ACM Symposium on User Interface Software and Technology, Oct. 22, 2017, pp. 57-69.

Bylinskii, et al., "Understanding Infographics Through Textual and Visual Tag Prediction", In Repository of arXiv:1709.09215v1, Sep. 26, 2017, 11 Pages.

Chalbi, et al., "Common Fate for Animated Transitions in Visualization", In Journal of IEEE Transactions on Visualization and Computer Graphics, vol. 26, Issue 1, Jan. 2020, pp. 386-396.

Chen, et al., "Towards Automated Infographic Design: Deep Learning-based Auto-Extraction of Extensible Timeline", In Journal of IEEE Transactions on Visualization and Computer Graphics, vol. 26, Issue 1, Aug. 16, 2019, pp. 917-926.

Chevalier, et al., "Animations 25 Years Later: New Roles and Opportunities", In Proceedings of the International Working Conference on Advanced Visual Interfaces, Jun. 7, 2016, pp. 280-287.

Chevalier, et al., "Using Text Animated Transitions to Support Navigation in Document Histories", In Proceedings of the 28th International Conference on Human Factors in Computing Systems, Apr. 10, 2010, pp. 683-692.

Cui, et al., "Text-to-Viz: Automatic Generation of Infographics from Proportion-Related Natural Language Statements", In Journal of IEEE Transactions on Visualization and Computer Graphics, vol. 26, Issue 1, Aug. 16, 2019, pp. 906-916.

Desolneux, et al., "Gestalt Theory and Computer Vision", In Journal of Seeing, Thinking and Knowing, 2004, pp. 71-101.

Dragicevic, et al., "Gliimpse: Animating from Markup Code to Rendered Documents and Vice Versa", In Proceedings of the 24th Annual ACM Symposium on User Interface Software and Technology, Oct. 16, 2011, pp. 257-262.

Dragicevic, et al., "Temporal Distortion for Animated Transitions", In Proceedings of the International Conference on Human Factors in Computing Systems, May 7, 2011, pp. 2009-2018.

(56) References Cited

OTHER PUBLICATIONS

Du, et al., "Trajectory Bundling for Animated Transitions", In Proceedings of the 33rd Annual ACM Conference on Human Factors in Computing Systems, Apr. 18, 2015, pp. 289-298.
Elmqvist, et al., "Rolling the Dice: Multidimensional Visual Exploration using Scatterplot Matrix Navigation", In Journal of IEEE Transactions on Visualization and Computer Graphics, vol. 14, Issue 6, Oct. 24, 2008, 9 Pages.
Fu, et al., "Visualization Assessment: A Machine Learning Approach", In Proceedings of IEEE Visualization Conference, Oct. 20, 2019, pp. 126-130.
Gao, et al., "NewsViews: An Automated Pipeline for Creating Custom Geovisualizations for News", In Proceedings of the SIGCHI Conference on Human Factors in Computing Systems, Apr. 26, 2014, pp. 3005-3014.
Haroz, et al., "ISOTYPE Visualization—Working Memory, Performance, and Engagement with Pictographs", In Proceedings of the 33rd Annual ACM Conference on Human Factors in Computing Systems, Apr. 18, 2015, pp. 1191-1200.
Heer, et al., "Animated Transitions in Statistical Data Graphics", In Journal of IEEE Transactions on Visualization and Computer Graphics, vol. 13, Issue 6, Nov. 5, 2007, pp. 1240-1247.
Hullman, et al., "A Deeper Understanding of Sequence in Narrative Visualization", In Journal of IEEE Transactions on Visualization and Computer Graphics, vol. 19, Issue 12, Dec. 2013, pp. 2406-2415.
Hullman, et al., "Contextifier: Automatic Generation of Annotated Stock Visualizations", In Proceedings of the SIGCHI Conference on Human Factors in Computing Systems, Apr. 27, 2013, pp. 2707-2716.
Hullman, et al., "Finding a Clear Path: Structuring Strategies for Visualization Sequences", In Journal of Computer Graphics Forum, vol. 36, Jul. 4, 2017, pp. 365-375.
Zhao, et al., "What Characterizes Personalities of Graphic Designs?", In Journal of ACM Transactions on Graphics, vol. 37, Issue 4, Aug. 2018, 15 Pages.
Huron, et al., "Visual Sedimentation", In Journal of IEEE Transactions on Visualization and Computer Graphics, vol. 19, Issue 12, Dec. 2013, pp. 2446-2455.
Kim, et al., "Data-Driven Guides: Supporting Expressive Design for Information Graphics", In Journal of IEEE Transactions on Visualization and Computer Graphics, vol. 23, Issue 1, Jan. 2017, pp. 491-500.
Kim, et al., "Designing Animated Transitions to Convey Aggregate Operations", In Journal of Computer Graphics Forum, vol. 3, Issue 3, Jul. 10, 2019, pp. 541-551.
Kim, et al., "GraphScape: A Model for Automated Reasoning about Visualization Similarity and Sequencing", In Proceedings of the CHI Conference on Human Factors in Computing Systems, May 6, 2017, pp. 2628-2638.
Liu, et al., "Data Illustrator: Augmenting Vector Design Tools with Lazy Data Binding for Expressive Visualization Authoring", In Proceedings of the CHI Conference on Human Factors in Computing Systems, Apr. 21, 2018, 13 Pages.

Lu, et al., "Exploring Visual Information Flows in Infographics", In Proceedings of the CHI Conference on Human Factors in Computing Systems, Apr. 25, 2020, 12 Pages.
McKenna, et al., "Visual Narrative Flow: Exploring Factors Shaping Data Visualization Story Reading Experiences", In Journal of Computer Graphics Forum, vol. 36, Issue 3, Jul. 4, 2017, pp. 377-387.
Xia, et al., "DataInk: Direct and Creative Data-Oriented Drawing", In Proceedings of the CHI Conference on Human Factors in Computing Systems, Apr. 21, 2018, 13 Pages.
"International Search Report and Written Opinion Issued in PCT Application No. PCT/US21/031473", Mailed Date: Aug. 19, 2021, 11 Pages.
Petrov, Lara, "Towards New AI-Based Animation", Retrieved From: https://medium.com/@lara.petrov/towards-new-ai-based-animation-ba61cf7e89ba, Jul. 17, 2017, 5 Pages.
Ren, et al., "Charticulator: Interactive Construction of Bespoke Chart Layouts", In Journal of IEEE Transactions on Visualization and Computer Graphics, vol. 25, Issue 1, Jan. 2019, pp. 789-799.
Ren, et al., "IVisDesigner: Expressive Interactive Design of Information Visualizations", In Proceedings of IEEE Transactions on Visualization and Computer Graphics, vol. 20, Issue 12, Dec. 2014, pp. 2092-2101.
Ruchikachorn, et al., "Learning Visualizations by Analogy: Promoting Visual Literacy through Visualization Morphing", In Journal of IEEE Transactions on Visualization and Computer Graphics, vol. 21, Issue 9, Sep. 2015, pp. 1028-1044.
Satyanarayan, et al., "Critical Reflections on Visualization Authoring Systems", In Journal of IEEE Transactions on Visualization and Computer Graphics, vol. 26, Issue 1, Aug. 16, 2019, pp. 461-471.
Satyanarayan, et al., "Lyra: An Interactive Visualization Design Environment", In Proceedings of Computer Graphics Forum, vol. 33, Jul. 12, 2014, pp. 351-360.
Sigovan, et al., "Visualizing Large-scale Parallel Communication Traces Using a Particle Animation Technique", In Proceedings of Computer Graphics Forum, vol. 32, Issue 3, Jul. 1, 2013, pp. 141-150.
Wang, et al., "A Guided Tour of Literature Review: Facilitating Academic Paper Reading with Narrative Visualization", In Proceedings of the 9th International Symposium on Visual Information Communication and Interaction, Sep. 24, 2016, pp. 17-24.
Wang, et al., "Animated Narrative Visualization for Video Clickstream Data", In Proceedings of SIGGRAPH Asia Symposium on Visualization, Nov. 28, 2016, 8 Pages.
Wang, et al., "DataShot: Automatic Generation of Fact Sheets from Tabular Data", In Journal of IEEE Transactions on Visualization and Computer Graphics, vol. 26, Issue 1, Aug. 16, 2019, pp. 895-905.
Wang, et al., "InfoNice: Easy Creation of Information Graphics", In Proceedings of the CHI Conference on Human Factors in Computing Systems, Apr. 21, 2018, 12 Pages.
Weng, et al., "Photo Wake-Up: 3D Character Animation from a Single Photo", In Repository of arXiv:1812.02246v1, Dec. 5, 2018, 10 Pages.
Office Action Received for Chinese Application No. 202010622542. 8, mailed on Oct. 24, 2024, 17 pages (English Translation Provided).

* cited by examiner

UNIT 1

UNIT 2

UNIT 3

GENERATING ANIMATED INFOGRAPHICS FROM STATIC INFOGRAPHICS

CROSS-REFERENCE TO RELATED APPLICATION

This application is a U.S. National Stage Filing under 35 U.S.C. 371 of International Patent Application Serial No. PCT/US2021/031473, filed May 10, 2021, and published as WO 2022/005617 A1 on Jan. 6, 2022, which claims priority to Chinese Application No. 202010622542.8, filed Jun. 30, 2020, which applications and publication are incorporated herein by reference in their entirety.

BACKGROUND

Animated infographics, which present ideas in logical and understandable forms, have many advantages such as being informative, aesthetic and vivid. However, the design of animated infographics involves various creative means and requires tremendous efforts. Authoring an elaborate animated infographic involves controlling the motions of tens of visual elements. For example, to author animated infographics, designers usually use general-purpose video creation tools or visualization and animation code libraries. It takes hours, days, or even weeks to complete an animation of several seconds in length.

SUMMARY

In accordance with implementations of the subject matter described herein, there is provided an approach for generating animated infographics from static infographics. A computer-implemented method comprises: extracting visual elements of a static infographic; determining, based on the visual elements, a structure of the static infographic at least indicating a layout of the visual elements in the static infographic; and applying a dynamic effect to the visual elements based on the structure of the static infographic to generate an animated infographic.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference signs refer to the same or similar elements.

DETAILED DESCRIPTION

The subject matter described herein will now be discussed with reference to several example implementations. It is to be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

Figure 1:
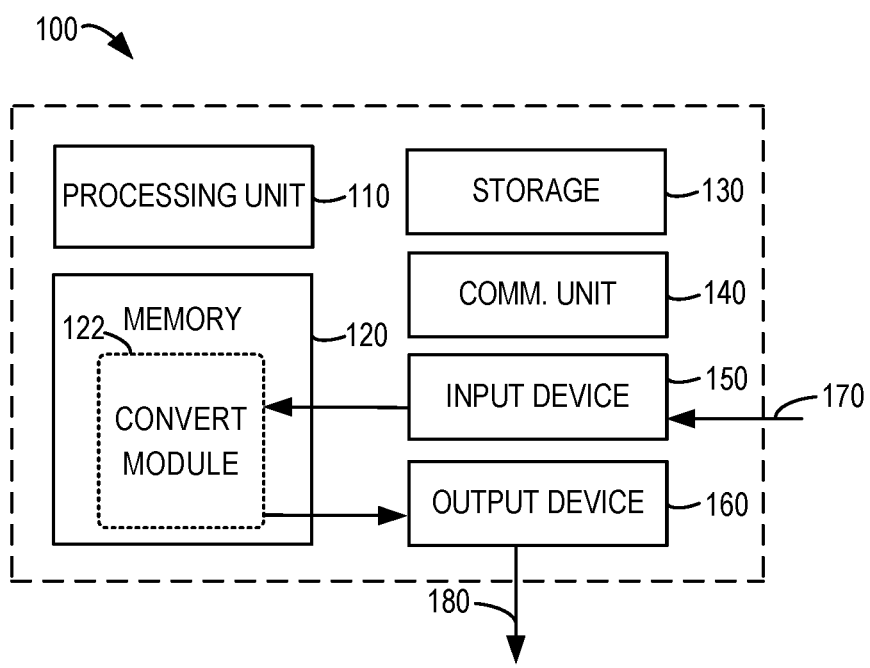
FIG. 1 illustrates a block diagram of a computing device for implementing various implementations of the subject matter described herein.

Basic principles and several example implementations of the subject matter described herein will be explained below with reference to the drawings. FIG. 1 illustrates a block diagram of a computing device 100 that can carry out a plurality of implementations of the subject matter described herein. It should be understood that the computing device 100 shown in FIG. 1 is only exemplary and shall not constitute any restrictions over functions and scopes of the implementations described by the subject matter described herein. According to FIG. 1, the computing device 100 includes a computing device 100 in the form of a general purpose computing device. Components of the computing device 100 can include, but not limited to, one or more processors or processing units 110, memory 120, storage device 130, one or more communication units 140, one or more input devices 150 and one or more output devices 160.

In some implementations, the computing device 100 can be implemented as various user terminals or service terminals with computing power. The service terminals can be servers, large-scale computing devices and the like provided by a variety of service providers. The user terminal, for example, is mobile terminal, fixed terminal or portable terminal of any types, including mobile phone, site, unit, device, multimedia computer, multimedia tablet, Internet nodes, communicator, desktop computer, laptop computer, notebook computer, netbook computer, tablet computer, Personal Communication System (PCS) device, personal navigation device, Personal Digital Assistant (PDA), audio/video player, digital camera/video, positioning device, television receiver, radio broadcast receiver, electronic book device, gaming device or any other combinations thereof consisting of accessories and peripherals of these devices or any other combinations thereof. It can also be predicted that the computing device 100 can support any types of user-specific interfaces (such as "wearable" circuit and the like).

The processing unit 110 can be a physical or virtual processor and can execute various processing based on the programs stored in the memory 120. In a multi-processor system, a plurality of processing units executes computer-executable instructions in parallel to enhance parallel processing capability of the computing device 100. The processing unit 110 also can be known as central processing unit (CPU), microprocessor, controller and microcontroller.

The computing device 100 usually includes a plurality of computer storage media. Such media can be any attainable media accessible by the computing device 100, including but not limited to volatile and non-volatile media, removable and non-removable media. The memory 120 can be a volatile memory (e.g., register, cache, Random Access Memory (RAM)), a non-volatile memory (such as, Read-Only Memory (ROM), Electrically Erasable Programmable Read-Only Memory (EEPROM), flash), or any combinations thereof. The memory 120 can include a converting module 122 configured to execute functions of various implementations described herein. The converting module 122 can be accessed and operated by the processing unit 110 to perform corresponding functions.

The storage device 130 can be removable or non-removable medium, and can include machine readable medium, which can be used for storing information and/or data and can be accessed within the computing device 100. The computing device 100 can further include a further removable/non-removable, volatile/non-volatile storage medium. Although not shown in FIG. 1, there can be provided a disk drive for reading from or writing into a removable and non-volatile disk and an optical disk drive for reading from or writing into a removable and non-volatile optical disk. In such cases, each drive can be connected via one or more data medium interfaces to the bus (not shown).

The communication unit 140 implements communication with another computing device through communication media. Additionally, functions of components of the computing device 100 can be realized by a single computing group or a plurality of computing machines, and these computing machines can communicate through communication connections. Therefore, the computing device 100 can be operated in a networked environment using a logic connection to one or more other servers, a Personal Computer (PC) or a further general network node.

The input device 150 can be one or more various input devices, such as mouse, keyboard, trackball, voice-input device and the like. The output device 160 can be one or more output devices, e.g., display, loudspeaker and printer etc. The computing device 100 also can communicate through the communication unit 140 with one or more external devices (not shown) as required, wherein the external device, e.g., storage device, display device etc., communicates with one or more devices that enable the users to interact with the computing device 100, or with any devices (such as network card, modem and the like) that enable the computing device 100 to communicate with one or more other computing devices. Such communication can be executed via Input/Output (I/O) interface (not shown).

In some implementations, apart from being integrated on an individual device, some or all of the respective components of the computing device 100 also can be set in the form of cloud computing architecture. In the cloud computing architecture, these components can be remotely arranged and can cooperate to implement the functions described by the subject matter described herein. In some implementations, the cloud computing provides computation, software, data access and storage services without informing a terminal user of physical positions or configurations of systems or hardware providing such services. In various implementations, the cloud computing provides services via Wide Area Network (such as Internet) using a suitable protocol. For example, the cloud computing provider provides, via the Wide Area Network, the applications, which can be accessed through a web browser or any other computing components. Software or components of the cloud computing architecture and corresponding data can be stored on a server at a remote position. The computing resources in the cloud computing environment can be merged or spread at a remote datacenter. The cloud computing infrastructure can provide, via a shared datacenter, the services even though they are shown as a single access point for the user. Therefore, components and functions described herein can be provided using the cloud computing architecture from a service provider at a remote position. Alternatively, components and functions can be provided from a conventional server, or they can be mounted on a client device directly or in other ways.

The computing device 100 can be used to implement the approach for generating dynamic infographics from static infographics in accordance with implementations of the subject matter described herein. The computing device 100 may receive, via the input device 150, input data such as static infographics and/or the like. Optionally, the computing device 100 also may receive, via the input device 150, the user's one or more operations on the static infographics or information acquired therefrom. The converting module 122 can process the input data (e.g., static infographics) to obtain corresponding output data, such as animated infographics etc. The output data can be provided to the output device 160 as an output 180 for the user and the like.

Figure 2:
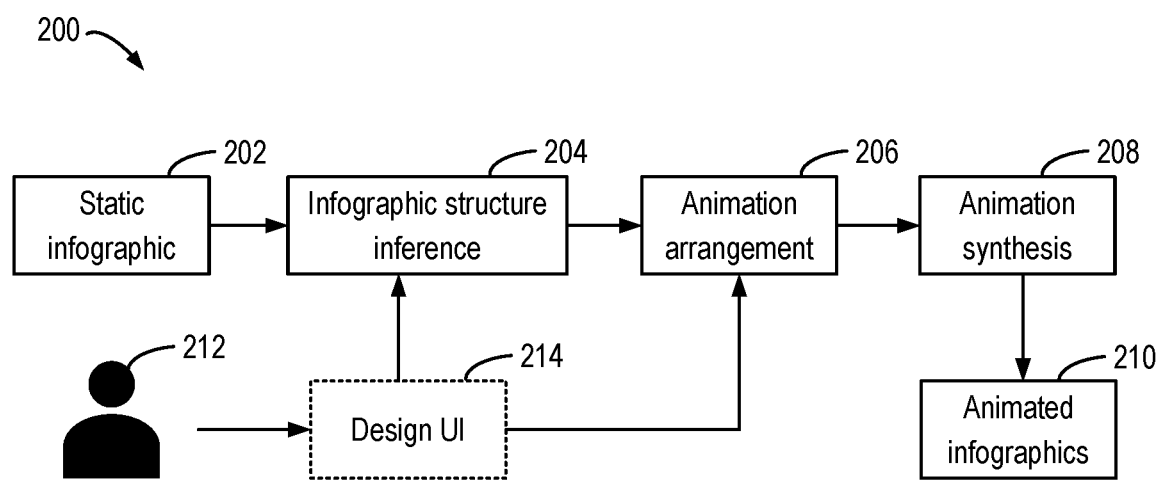
FIG. 2 illustrates a schematic diagram of architecture of a converting module in accordance with some implementations of the subject matter described herein.

FIG. 2 illustrates a schematic diagram of the structure of the converting module 200 in accordance with some implementations of the subject matter described herein. The converting module 200 may be implemented, for example, in the converting module 122 shown in FIG. 1, or in any other suitable environments, e.g., at least partially implemented at the cloud.

In the converting module 200, static infographics 202 are obtained, where the static infographics may be in the form of graphic design files, such as in the format of vector image (e.g., svg, psd, ppt, etc.) and may include various visual elements, e.g., textboxes, icons, shapes etc. With respect to the format of the vector image, the static infographics 202 may be parsed, based on the metadata of the vector image (such as tags and the like), into visual elements (e.g., textboxes, shapes, icons etc.) and their properties (e.g., position, color, and size etc.). In one example, structured data in the vector image may be converted into data representing the infographic structure. For example, in SVG files, shape tags like <rect>, <ellipse>, and general tags like <path> tag may be converted into data indicating different types of shapes and texts.

Figure 3:
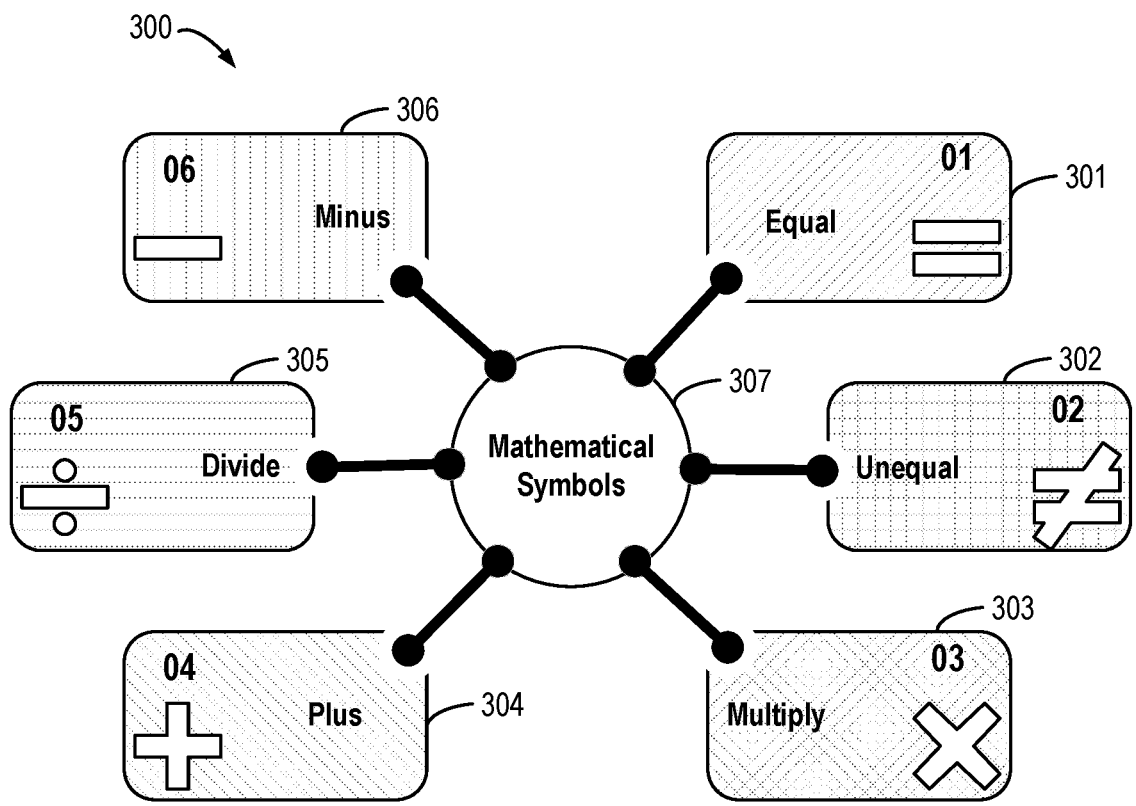
FIGS. 3-10 illustrate schematic diagrams of structures for extracting static infographics in accordance with some implementations of the subject matter described herein.

FIG. 3 illustrates a schematic diagram of static infographics 300 in accordance with some implementations of the subject matter described herein. The static infographic 300 includes 6 repeating units 301-306 presenting different mathematical symbols. For example, repeating unit 301 includes a unit icon "=," a unit title "equal" and a unit index "01" and a unit background filled with slash. The repeating units have similar structure and are connected to the title "mathematical symbols" (global textbox) via corresponding connectors. The visual elements in the static infographics 300 include textboxes, shapes and icons. For example, in the repeating unit 301, the unit icon "=" is considered as a icon, the unit title "equal" is considered as a textbox, the unit index "01" is considered as a textbox, and the unit background is considered as shape.

Returning to FIG. 2, infographic structure inference 204 can infer the structure of the static infographics 202 based on the extracted visual elements, where the structure at least indicates the layout of the visual elements in the static infographics 202. Additionally, the structure of the static infographics 202 may also include roles or functions of the visual elements in the static infographics 202, such as title, main body and footnotes etc. The approach for identifying and inferring the structure of the static infographics 202 is introduced below with reference to FIGS. 4-10.

In some implementations, the structure of the infographic may include the layout of icons, shapes and texts and most infographics include repeating units having similar designs. In some infographics, the repeating units are placed at specific positions to imply relations therebetween. In some other infographics, the units are connected via connectors to represent the relations therebetween. Some of the infographic designs contain index (numbers like 1, 2, 3), which indicates the order of the respective units, while many do not contain an index. The repeating units in some infographics include one title with the largest font size while the repeating units in some other infographics have a plurality of textboxes in the same font size. Accordingly, there are many technical challenges of automatically identifying and inferring the structure of the infographics.

In some implementations, a bottom-up approach is adopted to address the above issues, such as identifying the structure of infographics from atomic visual elements. For example, the approach starts by finding repeating (similar) elements that are used to build up repeating units. Then, those elements are organized into the repeating units, and the structure of the infographics is determined based on the repeating units. Finally, semantic and layout tags are added in the infographics to complete the structure inference in order to enable flexible animation arrangements.

The visual elements in an infographic design contribute to different infographic components. To build up the main body of an infographic with repeating units, the elements inside the units are first identified. These units are usually designed with the same (similar) elements and repeatedly appear in the infographic to enhance visual effects, which may serve as anchors for the repeating units.

In some infographics, the visual elements for repeating units are not exactly the same. For example, sibling shapes may have the same size, but with different colors; sibling textboxes may have different contents, lengths, but the same font. It is required to consider different similarity measurements to identify the visual elements. Additionally, the number of similar elements may be different from the unit number. For example, for an infographic with 5 units, the infographic may have 10 circles and each unit includes two circles accordingly; or the title textbox may be considered similar to the unit textbox as they use the same font size and style, which results into a greater number of identified similar elements than the unit number.

In some implementations, elements that are most probably inside the repeating units may be first determined. For example, similar elements may be grouped and groups with the most frequent element number are determined. For a given element, the rest elements in the infographic are searched to find elements similar to the given element having a similarity above a threshold. If similar elements are found, they are organized into the same group. If not, the element is put into a new group. After all elements in the infographic are put into groups, the process stops and the number of elements inside each group is calculated and the most frequent element number acts as the number of repeating units. In other words, for an infographic with n (n>2) units, the groups with the element number n appear most frequently, i.e., more visual elements having repeating design are put into groups of size n; however, the groups with the element number m (m>2, m≠n) appear less frequently, which means that fewer visual elements having repeating design are put into groups of size m.

Figure 4:
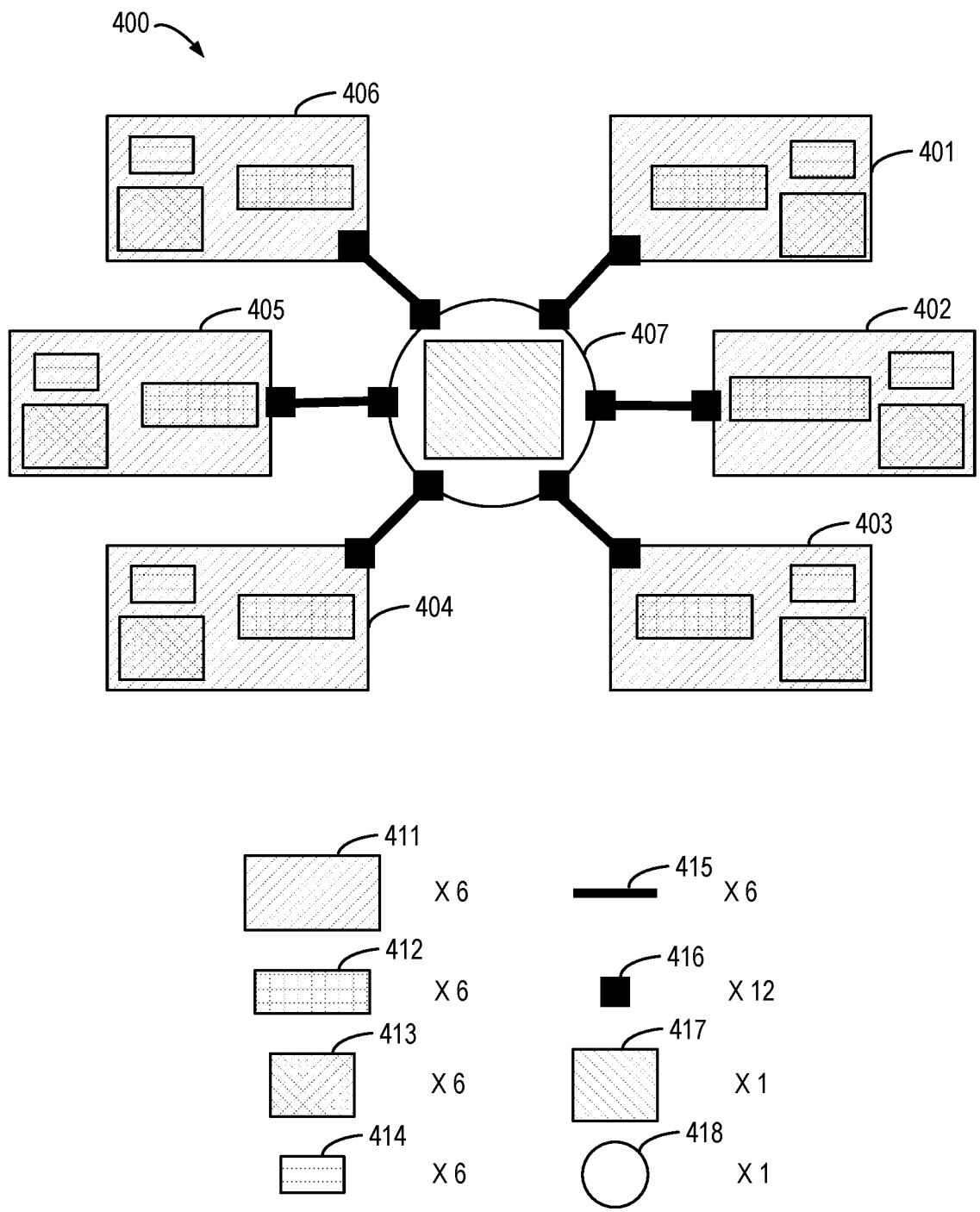

FIG. 4 illustrates a schematic diagram of identified similar elements 400 in accordance with some implementations of the subject matter described herein. As shown, there are 6 similar elements 411 representing elements in the visual elements 401-406 corresponding to shape of external contour of respective visual elements 301-306 in FIG. 3; 6 similar element 412 representing elements in the visual elements 401-406 corresponding to textbox of respective visual elements 301-306 in FIG. 3; 6 similar element 413 representing elements in the visual elements 401-406 corresponding to icon of respective visual elements 301-306 in FIG. 3; 6 similar element 414 representing elements in the visual elements 401-406 corresponding to index of respective visual elements 301-306 in FIG. 3; 6 similar element 415 denoting connectors in the visual elements 401-406; 12 similar element 416 denoting connecting points in the visual elements 401-406; 1 similar element 417 denoting elements in the visual element 407 corresponding to textbox of the visual element 307 in FIGS. 3; and 1 similar element 418 representing elements in the visual element 407 corresponding to circular shape of the visual element 307 in FIG. 3. Accordingly, five groups include 6 elements, one group includes 12 elements and two groups include 2 elements. Because the most frequent element number is 6 (with a frequency of 5), the number of repeating unit is 6.

In some implementations, to identify similar elements, different strategies or similarity measurements may be applied to different types of elements. For example, a static infographic usually contains three types of visual elements: shapes, textboxes and icons. In such case, the height and the width of the visual elements may be extracted. For shapes, their paths may be extracted and further categorized into basic shapes, e.g., circle, rectangle and the like. Shape similarity between two visual elements may be measured by shape type, width, height, color and filling pattern etc. Fonts of the texts within the textboxes may be extracted. As the text length for different units may vary, textbox similarity may be measured with font and the width of the textbox (if there are multiple rows of text). It should be understood that any other suitable similarity measurements may also be used.

After multiple groups of n similar visual elements are extracted, repeating units are constructed from the similar elements. For example, the visual elements may be separated into units based on the regularity principle. Generally speaking, elements are placed in regular patterns across units as designers often avoid crossing and long intervals for relative elements. In some implementations, repeating units may be constructed according to one or more of color scheme, similar layouts and element proximity.

For example, elements across units may adopt same or similar color scheme. Therefore, elements with similar colors are put into the same units. Then, the color elements are used as the anchors for the units to group the remaining colors without color encodings. Alternatively, elements within each unit may adopt same or similar color scheme. Therefore, elements having similar colors are placed into one same unit while elements with different colors are put into different units.

In some examples, for each identified repeating element, the layout of the elements may be determined in a group of similar elements. If the layouts are the same for different groups, the units may be constructed based on the coordinate positions of each element. For example, if all elements are horizontal, the elements are ordered based on horizontal positions and put into various units one by one.

In some examples, repeating units may be constructed according to element proximity. For example, infographic designs without standard layouts usually leverage proximity to enhance user perception, i.e., elements within one unit are more likely placed close to each other. Therefore, the repeating units may be constructed according to element proximity. For example, starting from one cluster or similar element group, the elements in the units are increased by searching the elements in other clusters or similar element groups that are closest to the units.

In some implementations, the anchors for the repeating units in the visual elements may be determined. Starting from the anchors, visual elements having a similarity with the anchor above a threshold are added to the repeating units represented by the anchors. The similarity may depend on color, layout and/or proximity. In a specific example, the repeating units may be constructed in turn in accordance with color, layout and/or proximity.

Figure 5:
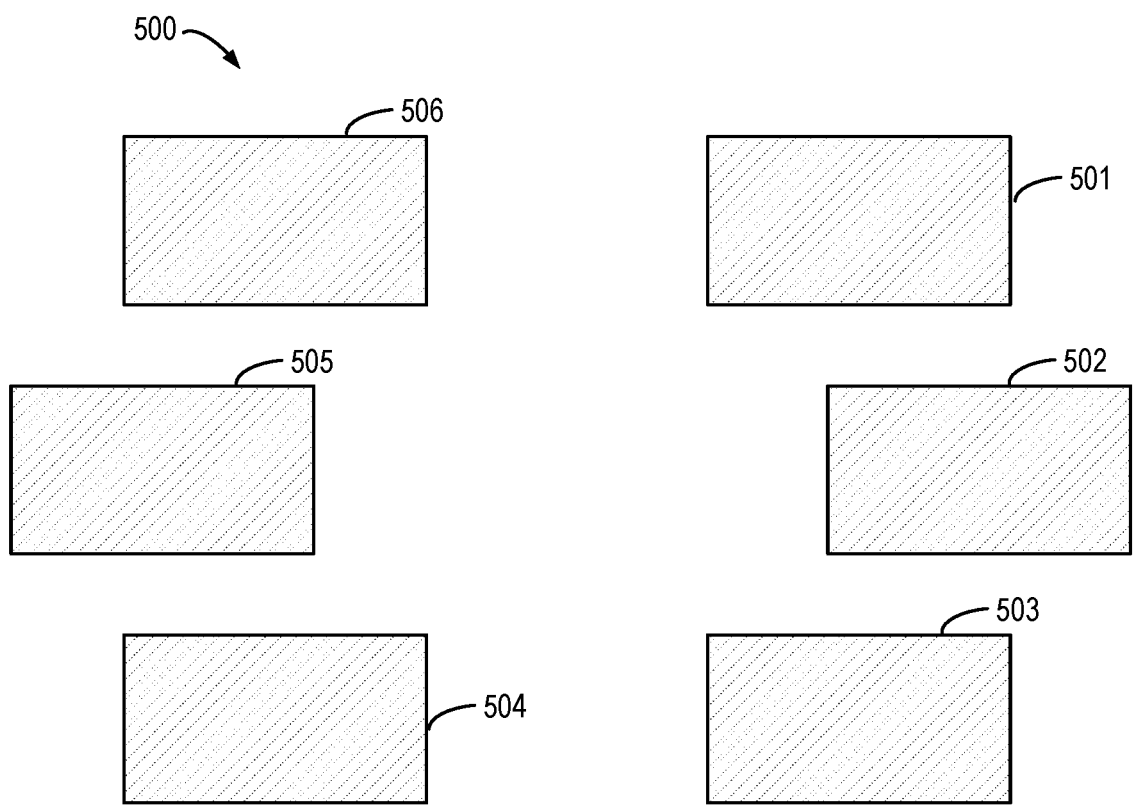

In the example shown by FIG. 5, a similar element group 500 includes elements 501-506, which elements may serve as anchors for constructing the repeating units. In the element 600 demonstrated by FIG. 6, the remaining elements with the element number 6 are all added into the corresponding repeating units based on element proximity, to form repeating units 601-606. In an example, element regularity across the units may be further exploited to avoid wrong grouping. For example, standard deviations of the distances between current units and the newly added elements may be calculated and the standard deviation should be lower than a threshold to avoid grouping by mistakes.

In some implementations, the elements in the similar element groups of size greater than n might be missed out from the units. In one example, there are n+1 similar textboxes in one similar element group, where n textboxes belong to n repeating units and one is a global textbox. In another example, each unit generates groups of size 2n using 2 similar embellishing shapes. In such case, missing elements may be added following the above strategies with the existing units as the anchors. For example, elements may be put into the repeating units according to color, layout and/or proximity.

As illustrated in FIG. 3, suppose that both unit textboxes and global textbox "mathematical symbols" of the units 301-306 are identified as textbox and placed into one similar element group instead of two different similar element groups 412 and 417 as shown in FIG. 4. Accordingly, the number of textbox in the similar element group is 7=6+1, where 6 textboxes belong to 6 repeating units and the remaining one is the global textbox. In this case, the textboxes may be put into the repeating units according to color, layout and/or proximity with the existing units shown in FIG. 5 as the anchors. As to the above example, the unit textboxes may be put into the repeating units based on proximity while the global textbox is not.

Figure 6:
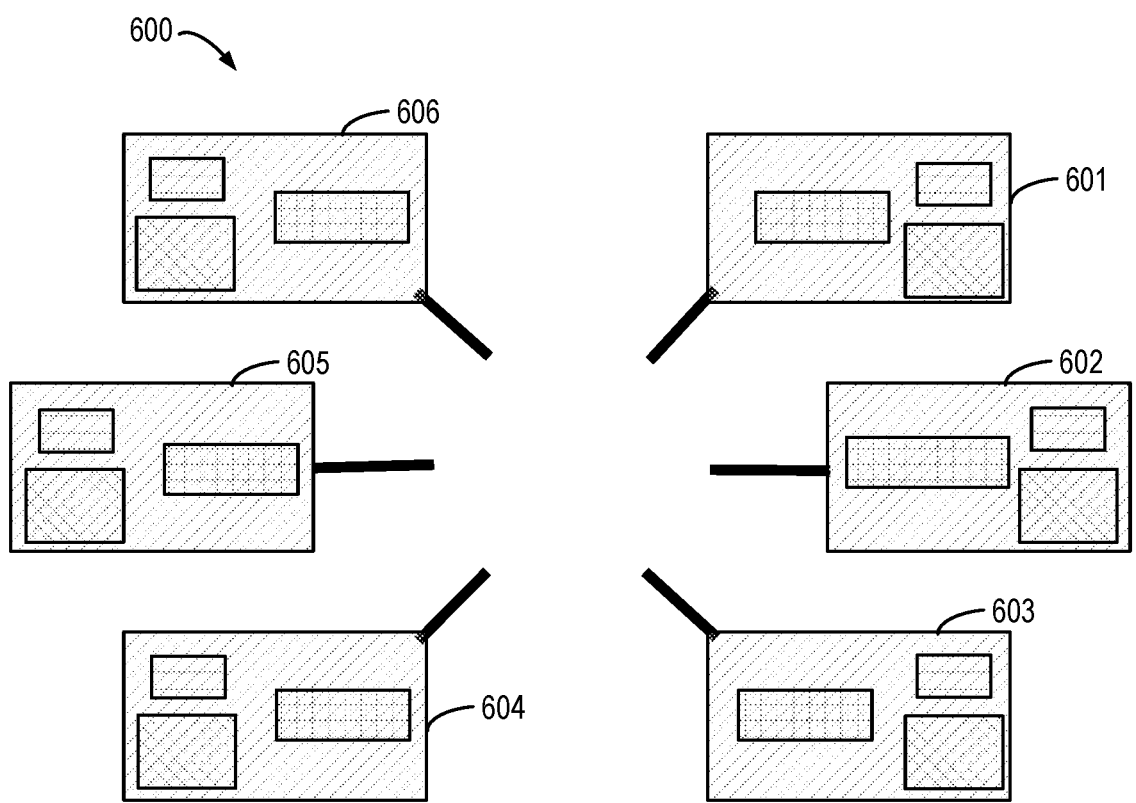
Figure 7:
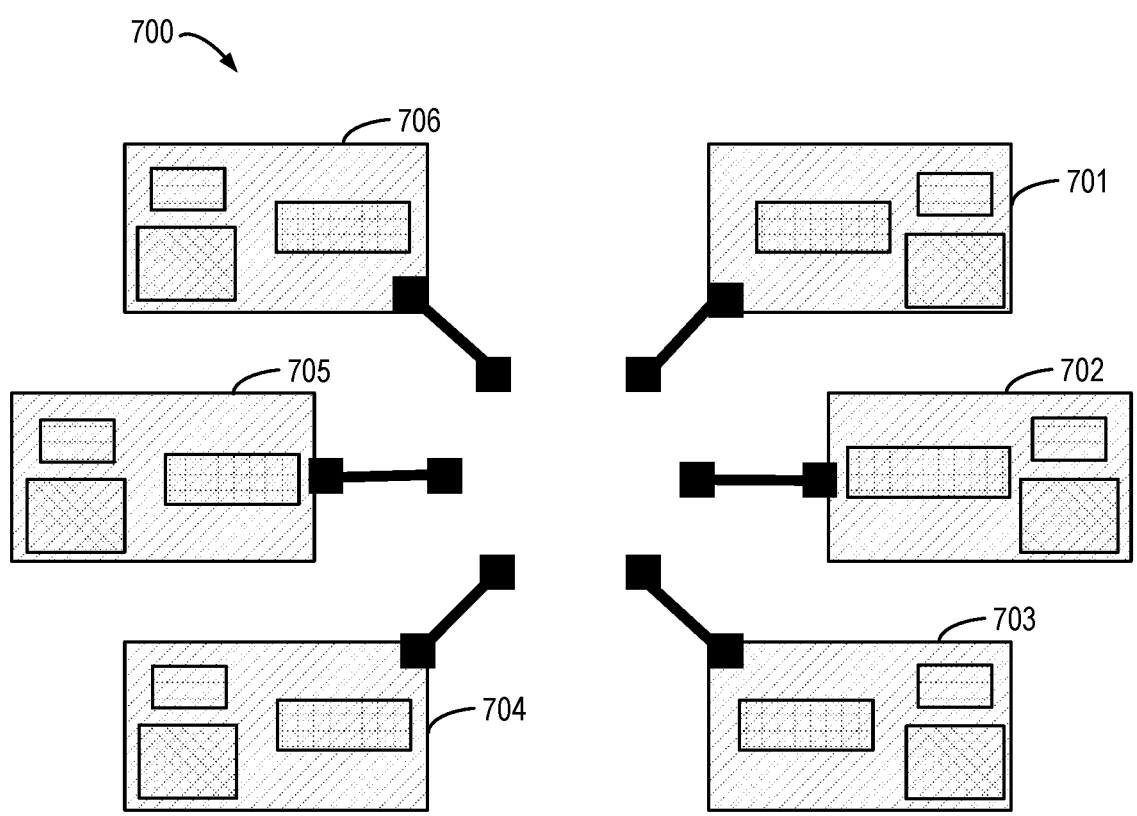

For example, the element 700 shown in FIG. 7 may be formed by adding endpoints of connectors into the element 600 of FIG. 6. According to FIG. 4, the number of similar elements 416 acting as the endpoint of the connector is 12=6×2. In this example, the elements may be put into corresponding repeating units based on proximity to form units 701-706 shown in FIG. 7.

In some implementations, after the repeating units are identified, the layout of the infographic may be further determined based on the repeating units and connectors in the infographic may also be determined. For example, common layouts include linear layout, radial layout, segmented layout and freeform layout. In the linear layout, respective units are in the same form and arranged into a straight line, e.g., a horizontal, vertical, or diagonal line etc. As to the radial layout, the respective units are placed together to form an arc or a circle. For the segmented layout, the respective units are arranged in a "zigzag" pattern and may be placed in horizontal, vertical or diagonal ways. In free-form layout, the units may not be arranged in regular patterns. For example, the units may be arranged along a freeform curve.

In some examples, infographic layouts may be classified based on the positions of the repeating units. If the infographic falls into to one of the layouts, the repeating units are connected into a sequence. Afterwards, the connector may be further searched by going through remaining visual elements that are within regions between two adjacent units. If the determined layout is in freeform, relations between respective units may be further specified according to the connectors, wherein the connector is a special type of repeating unit. To identify connectors, visual elements in line or arrow shapes that fall in the region between any two units or in other shapes representing a connection may be searched. With units and connectors identified, they are constructed into infographic structures.

In some examples, the order of units may be inferred from the text content of the textboxes. For example, if there are indexes (e.g., 1, 2, 3 etc.), the index sequences may be followed. If there are connectors with directions such as arrows, the units are traversed following the directions of connectors. If no such contents are found in the infographics, the unit order may be determined by a reading order (e.g., left to right, top to bottom, clockwise, counterclockwise).

Figure 8:
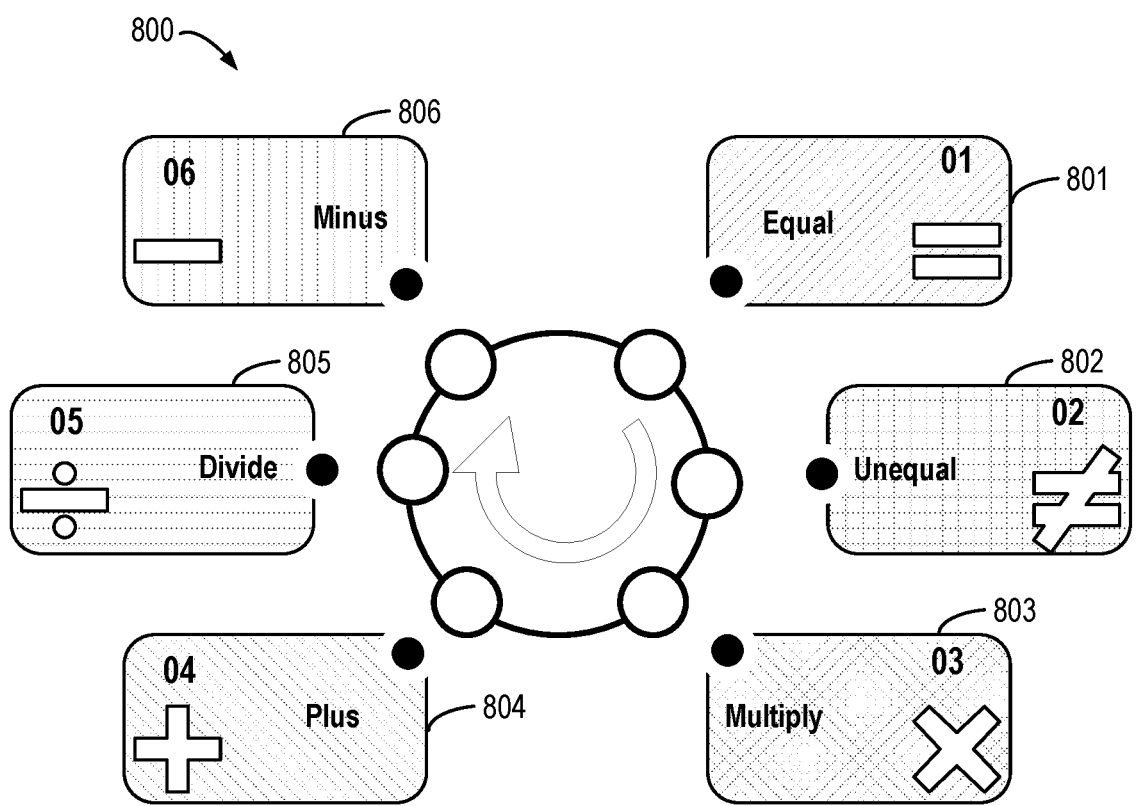

FIG. 8 illustrates a schematic diagram for layout identification in accordance with some implementations of the subject matter described herein. It is determined from the positions of the units 801-806 that the infographic is in the radial layout. In the layout 800, text contents identified from the units 801-806 respectively include indexes 01-06. Accordingly, the order of the respective units may be determined based on the index sequence, i.e., clockwise sequence as shown in FIG. 8.

After the structure of the infographic is built, semantic tags are added for the infographic components based on heuristic rules to indicate roles of various elements in the infographic and further enable flexible animation arrangements. For example, semantic tags may be added for the elements left out from the repeating units and connectors as global level infographic components, like title, description, background, main body, and footnotes. For example, the textbox with the largest font size near to the canvas borders is assigned as the infographic title; visual elements with the lowest z-order are considered the background (where z-order represents display layer of elements within a window and the display layer is closer to the top as the value of z-order increases); textboxes at the bottom with small font size are considered footnotes. Semantic tags also may be added to the visual elements within a unit. For example, elements within a unit may include unit titles, unit icons, unit background and the like.

Figure 9:
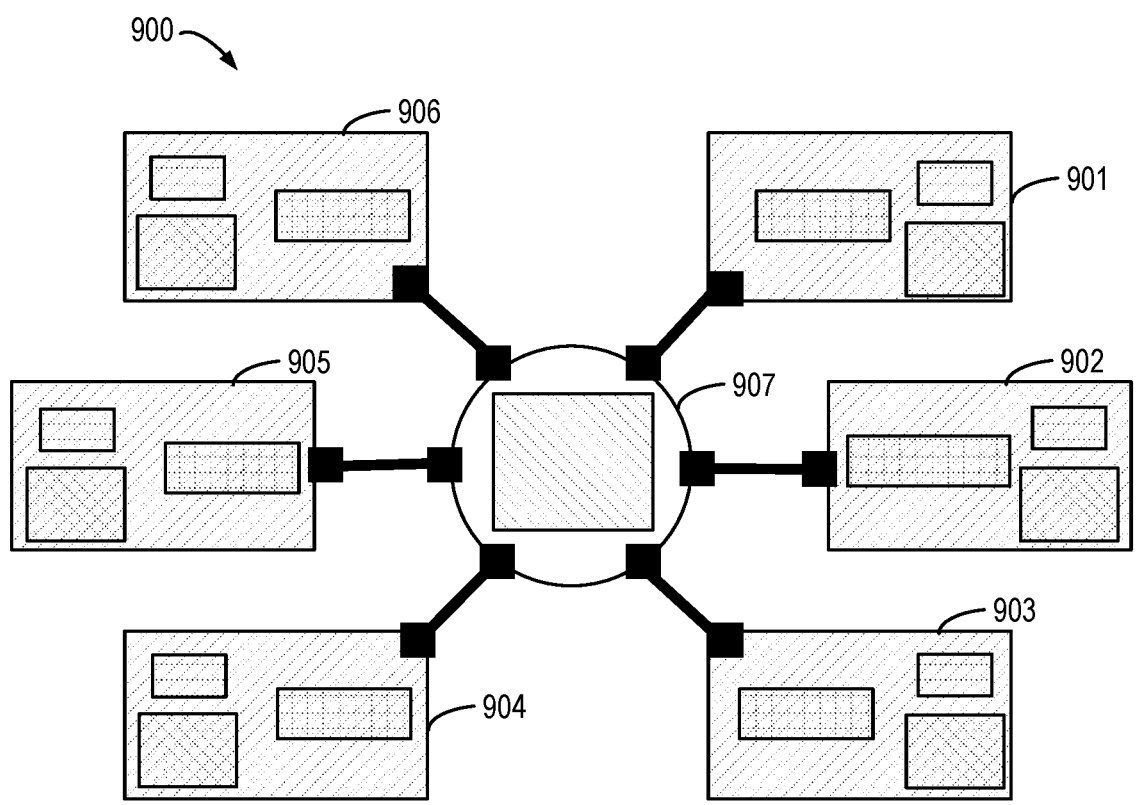
Figure 10:
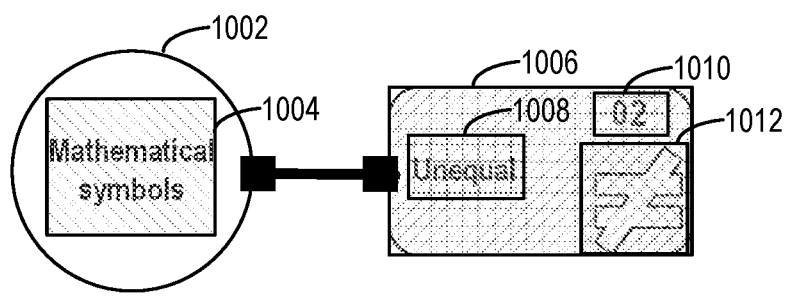

FIGS. 9 and 10 illustrate examples about how the semantic tags are added, wherein element 900 includes repeating units 901-906 and visual element 907 and FIG. 10 demonstrates specific examples of the repeating unit 902 and the visual element 907 in FIG. 9. As shown in FIG. 10, element 1002 is background, element 1004 is title, element 1006 is unit background, element 1008 is unit title, element 1010 is unit index and element 1012 is unit icon.

Now returning to FIG. 2, the infographic structure inference 204 may output a main body (e.g., text) with structure information, and identifies other components such as title, footnote, and background. Animation arrangement 206 may be performed with the above information to apply dynamic effects to the visual elements, such as arranging animation sequence and applying staging and animation effects etc. The animation sequence presents a temporal order of the visual elements while the staging refers to demonstrating the visual elements in a graded manner, for example, how the elements are graded and/or which elements are displayed simultaneously.

In some implementations, animation sequence may be arranged based on the reading order. For example, infographic components within an infographic design may lack clear dependencies or logical orders. In this case, the animation sequence may be arranged following the reading orders (e.g., from left to right, from top to bottom, clockwise or counterclockwise). In some further implementations, the animation sequence may be arranged based on semantic tags. For example, many designs adopt a semantic order, i.e., the title appears at first, followed by the subtitle and the footnotes appears last. For the infographics without a clear layout pattern, this approach is preferred. Based on the semantic tags, it is easy to adjust content sequences. It is to be understood that any other suitable animation sequences also may be adopted in addition to the above ones.

Figure 11:
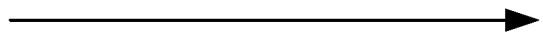
FIGS. 11-13 illustrate schematic diagrams of animation sequences in accordance with some implementations of the subject matter described herein.
Figure 11:
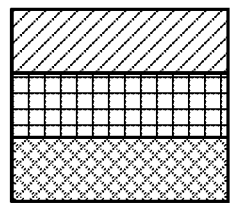
Figure 11:
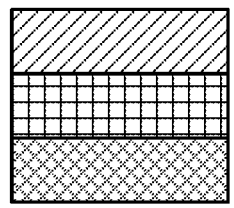
Figure 11:
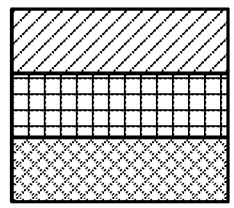
Figure 12:
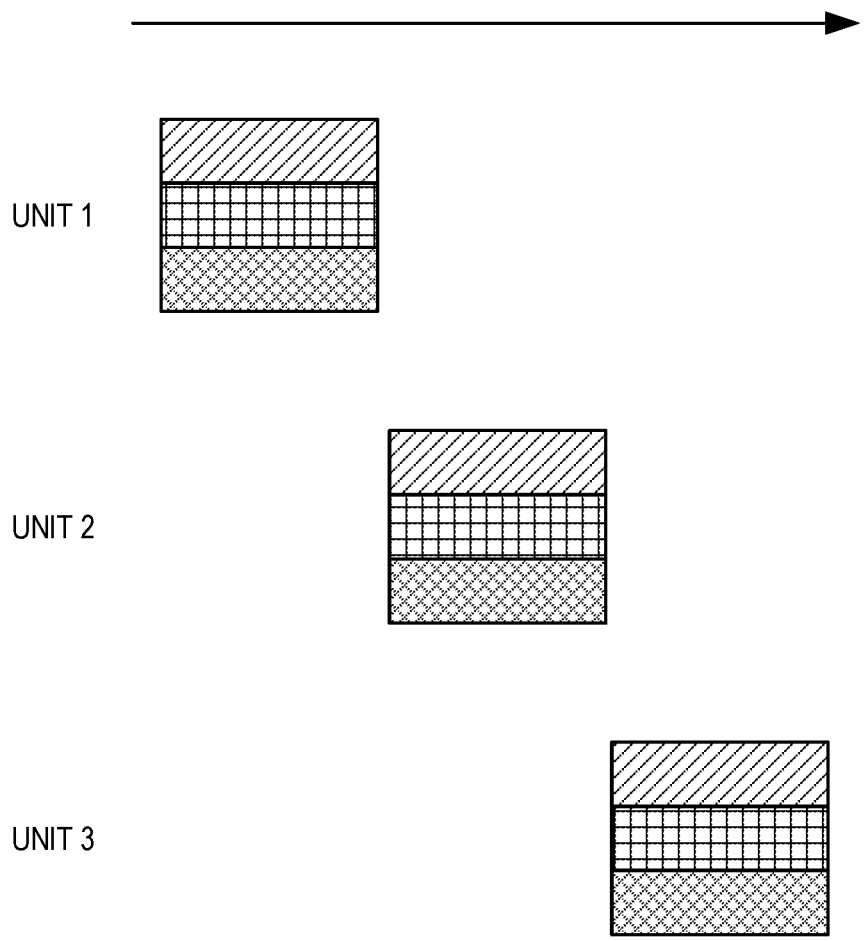
Figure 13:
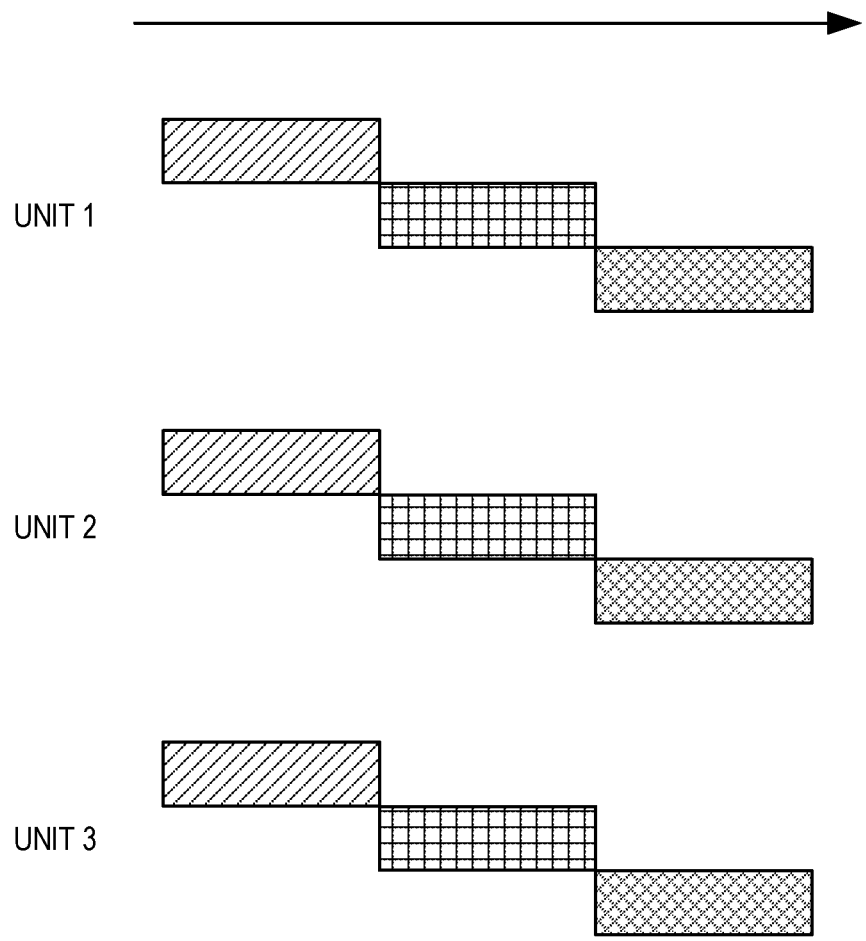

Within the main body, the animation sequence also may be assigned. For example, the infographic structure inference 204 may determine the structure of the main body of an infographic. For infographics with obvious sequence cues, such as indexes and arrows, the original orders of the infographics may be followed. For infographics without specific orders, reading orders may be adopted. One special structure of infographics is parallel, meaning all the units are not ordered. For example, the units may be evenly arranged from top to bottom, and are not linked. Two arrangements of elements are provided: unit-first and group-first. The unit-first method prioritizes the unit relations of the elements, where units are shown one by one and the elements in a unit tend to appear together. The group-first method prioritizes the corresponding elements across units and similar elements are shown together. For example, all the unit titles may appear first, followed by all the unit descriptions. FIGS. 11-13 demonstrate different examples of the animation sequences, where FIG. 11 illustrates an example of simultaneous display of three units, FIG. 12 illustrates an example of the unit-first approach with three units displayed in sequence, and FIG. 13 illustrates an example of the group-first approach with three groups displayed in turn.

In some implementations, the animations may be arranged according to semantic hierarchical levels of the infographic components. Showing all animations one by one can be cluttered and unfocused, while showing animations at the same time can be overwhelming and hard to follow. The stating strategy may be applied to merge animations into several stages. For example, the components are graded, meaning visual elements at one hierarchical level are shown together. The infographic titles, footnotes, descriptions may be shown in an equal rank. Within the main body of the infographic, elements within one unit may be considered as one hierarchical level and displayed at the same time.

Figure 14:
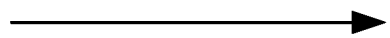
FIGS. 14-16 illustrate schematic diagrams of staging in accordance with some implementations of the subject matter described herein.
Figure 14:
Figure 14:
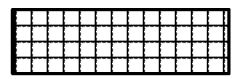
Figure 14:
Figure 15:
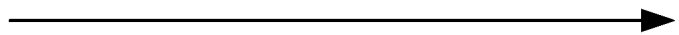
Figure 15:
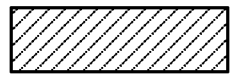
Figure 15:
Figure 15:
Figure 16:
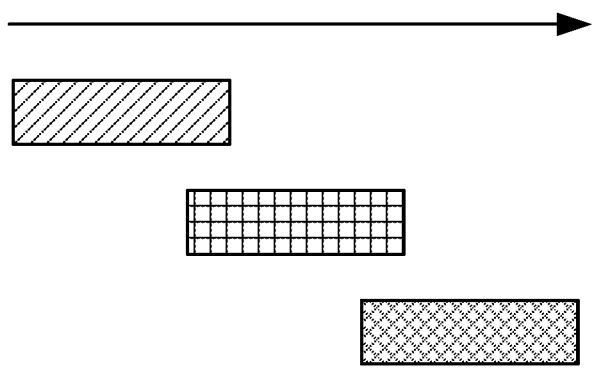

FIGS. 14-16 illustrate three animation arrangements, wherein FIG. 14 demonstrates an example of concurrent playing or presenting; FIG. 15 shows an example of playing or presenting one by one or one after another; and FIG. 16 demonstrates an example of playing or presenting in a staggered manner, i.e., all animations start at different times and each animation overlaps with a previous one for a certain period of time. The choice of animation arrangements may depend on the number of elements and the complexity of units. In one example, the infographic components like title, footnote may be set as "one by one;" for the main body structure of the infographic, the repeating units are shown in a "staggering" manner; and within each repeating unit, the elements are shown "all at once."

In some implementations, the animated infographics may be generated via a machine learning model (e.g., decision tree model) to apply dynamic effects to the visual elements. In one example, a decision tree model is trained on datasets of the visual elements, wherein the model takes property as the input including, for example, width, height, shape and layout (position relations between the element and the connector) of each element and dynamic effects as the output consisting of fading, appearing, zooming, wiping, and flying in and out among other animation effects and directions thereof. For example, the decision tree may recommend one or more dynamic effect options for each visual element within a unit. It should be appreciated that any other suitable models (such as neural network model) also may be adopted to generate animated infographics.

Designers may choose the dynamic effects based on various factors, such as semantic structure, element shape, aspect ratios, or personal preference etc. To this end, a plurality of dynamic effect options may be provided in some examples for users to choose. Depending on the flexibility of animation design environments, more dynamic effects may be adopted to offer more animation design choices.

Now returning to FIG. 2, the output of the infographic structure inference 204 and the animation arrangement 206 is an abstract specification of the infographic design. Infographic designs are organized into hierarchical structures consisting of visual elements. Animations may be applied to each visual element. For each animation, delay (start time), duration, effect type and effect direction are described.

In animation synthesis 208, depending on different applications, the extracted infographic specifications are translated to the supported animation types and synthesized into animated infographics 210. For a static infographic 210, a plurality of animated infographics 210 may be determined and they are presented to the user for selection. Alternatively, it is also possible that only one optimal animated infographic 210 is provided to the user.

FIG. 2 also demonstrates a designer 212 who may adjust the infographic structure inference 204 and the animation arrangement 206 via a design user interface (UI) 214. For example, the designer 212 may select an inference criterion from the infographic structure inference 204, such as a criterion for identifying the repeating units. Moreover, the designer 212 also may modify intermediate results in the infographic structure inference 204, e.g., adding, modifying or deleting semantic tags etc. In this way, the designer 212 may correct the inference result. In some examples, the designer 212 may select criteria and animation effects in the animation arrangement 206 to embody designer's preferences.

Figure 17:
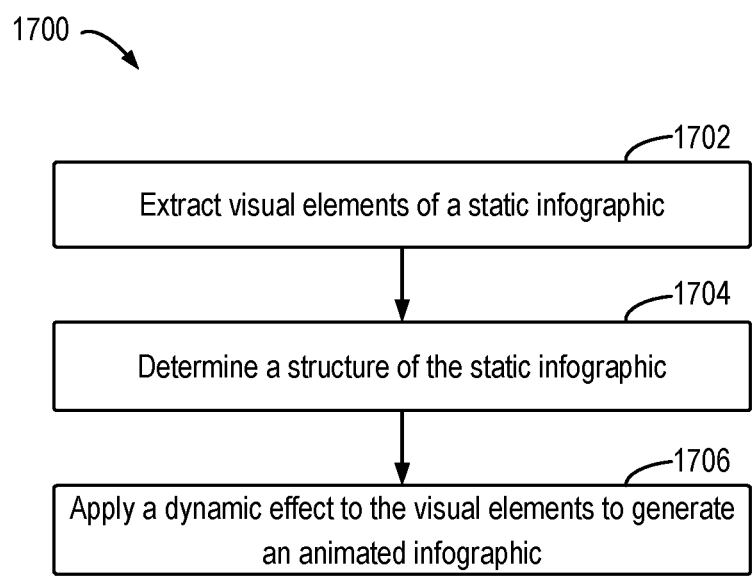
FIG. 17 illustrates a flowchart of a converting method in accordance with some implementations of the subject matter described herein.

FIG. 17 illustrates a flowchart of a method 1700 for converting static infographics into dynamic infographics in accordance with some implementations of the subject matter described herein. The method 1700 may be implemented in the converting module 122 as shown in FIG. 1, or in any other suitable architecture.

At block 1702, visual elements of the static infographic are extracted. For example, the static infographic may be a vector image or vector file. Accordingly, the visual elements of the static infographic may be extracted based on the metadata or the structural data in the vector file.

At block 1704, structure of the static infographic is determined based on the visual elements, the structure at least indicating a layout of the visual elements in the static infographic. For example, the structure of the static infographic may be determined by the infographic structure inference 204 shown in FIG. 2.

In some implementations, determining the structure of the static infographic comprises: identifying repeating units of the visual elements; and determining the layout of the visual elements in the static infographic based on the repeating units.

In some implementations, the method 1700 further comprises: adding to the visual elements semantic tags indicating roles of the visual elements.

In some implementations, determining the repeating units comprises: separating the visual elements into a plurality of groups based on similarity between the visual elements; and determining the most frequent number of visual elements within the plurality of groups as the number of the repeating units.

In some implementations, determining the repeating units comprises: determining the repeating units based on at least one of color, layout and proximity of the visual elements.

In some implementations, determining the repeating units comprises: determining an anchor for the repeating units in the visual elements; and adding a visual element of the visual elements having a similarity with the anchor above a threshold into repeating units represented by the anchor.

In some implementations, determining the layout comprises: determining the layout based on positions of the repeating units; and determining connectors between repeating units based on visual elements positioned between the repeating units.

At block 1706, one or more dynamic effects are applied to the visual elements based on the structure of the static infographic to generate an animated infographic. For example, the animated infographic may be generated via the animation arrangement 206 shown in FIG. 2.

In some implementations, applying the dynamic effects comprises at least one of: specifying an animation sequence of the visual elements, the animation sequence indicating a temporal sequence for displaying the visual elements; specifying staging of the visual elements, the staging indicating how to show the visual elements by groups; and applying animation effects to the visual elements.

In some implementations, the animation sequence is determined by at least one of: determining an animation sequence of the visual elements based on a reading order; and determining an animation sequence of the visual elements based on sematic tags of the visual elements.

In some implementations, the staging is one or more selected from: one by one, concurrent and staggering.

Some example implementations of the subject matter described herein are provided below.

In the first aspect, the subject matter provides a computer-implemented method. The method comprises: extracting visual elements of a static infographic; determining, based on the visual elements, a structure of the static infographic at least indicating a layout of the visual elements in the static infographic; and applying a dynamic effect to the visual elements based on the structure of the static infographic to generate an animated infographic.

In some implementations, determining the structure of the static infographic comprises: identifying repeating units of the visual elements; and determining the layout of the visual elements in the static infographic based on the repeating units.

In some implementations, the method also comprises: adding to the visual elements semantic tags indicating roles of the visual elements.

In some implementations, determining the repeating units comprises: separating the visual elements into a plurality of groups based on similarities between the visual elements; and determining a most frequent number of visual elements in the plurality of groups, as a number of the repeating units.

In some implementations, determining the repeating units comprises: determining the repeating units based on at least one of color, layout and proximity of the visual elements.

In some implementations, determining the repeating units comprises: determining an anchor for the repeating units in the visual elements; and adding a visual element of the visual elements having a similarity above a threshold with the anchor into a repeating unit represented by the anchor.

In some implementations, determining the layout comprises: determining the layout based on positions of the repeating units; and determining connectors between repeating units based on visual elements positioned between the repeating units.

In some implementations, applying the dynamic effect comprises at least one of: specifying an animation sequence of the visual elements, the animation sequence indicating a temporal sequence for displaying the visual elements; specifying staging of the visual elements, the staging indicating how to show the visual elements in a hierarchical way; and applying an animation effect to the visual elements.

In some implementations, the animation sequence is determined by at least one of: determining an animation sequence of the visual elements based on a reading order; and determining an animation sequence of the visual elements based on sematic tags of the visual elements.

In some implementations, the staging is one or more selected from: one by one, concurrent and staggering.

In the second aspect, the subject matter provides a device. The device comprises: a processing unit; and a memory coupled to the processing unit and including instructions stored thereon, the instructions, when executed by the processing unit, causing the device to execute the method according to the first aspect of the subject matter.

In the third aspect, the subject matter provides a computer program product tangibly stored in a non-transitory computer storage medium and including machine-executable instructions, the machine-executable instructions, when executed by a device, causing the device to perform a method in the first aspect of the subject matter.

In the fourth aspect, the subject matter provides a computer-readable storage medium stored thereon with computer-executable instruction, the computer-executable instructions, when executed by the device, causing the device to perform a method in the first aspect of the subject matter.

The functionality described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, it should be understood that the operations are required to be executed in the shown particular order or in a sequential order, or all shown operations are required to be executed to achieve the expected results. In certain circumstances, multitasking and parallel processing may be advantageous. Likewise, while several specific implementation details are contained in the above discussions, these should not be construed as limitations on the scope of the subject matter described herein. Certain features that are described in the context of separate implementations may also be implemented in combination in a single implementation. Conversely, various features that are described in the context of a single implementation may also be implemented in multiple implementations separately or in any suitable subcombination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method, comprising:
    extracting visual elements of a static infographic, the static infographic being an image described in a graphic design file;
    determining, based on the visual elements, a structure of the static infographic indicating a layout of the visual elements in the static infographic, wherein determining the structure of the static infographic comprises:
        identifying visual elements that are similar to other visual elements;
        determining a number of repeating units based on a frequency of repetition of the visual elements;
        constructing repeating units based on the determined number of repeating units; and
        determining the layout of the visual elements in the static infographic based on the constructed repeating units; and
    applying a dynamic effect to the visual elements based on the structure of the static infographic to generate an animated infographic.

2. The method of claim 1 further comprising:
    adding to the visual elements semantic tags indicating roles of the visual elements.

3. The method of claim 1, wherein determining the number of repeating units comprises:
    separating the visual elements into a plurality of groups based on similarities between the visual elements; and
    determining a most frequent number of visual elements in the plurality of groups as a number of the repeating units.

4. The method of claim 1, wherein identifying visual elements that are similar to other visual elements comprises:
    determining similarity of the visual elements based on at least one of color, layout, and proximity of the visual elements.

5. The method of claim 1, wherein determining the layout of the visual elements further comprises:
    determining an anchor for a first repeating unit from the repeating units;
    selecting a visual element having a similarity above a threshold with the anchor; and
    adding the selected visual element to the first repeating unit associated with the anchor.

6. The method of claim 1, wherein determining the layout of the visual elements comprises:
    determining the layout based on positions of the repeating units in the static infographic; and
    determining connectors between the repeating units based on visual elements positioned between the repeating units.

7. The method of claim 1, wherein applying the dynamic effect comprises at least one of:
    specifying an animation sequence of the visual elements, the animation sequence indicating a temporal sequence for displaying the visual elements;
    specifying staging of the visual elements, the staging indicating how to show the visual elements in a hierarchical way; and
    applying an animation effect to the visual elements.

8. The method of claim 7, wherein the animation sequence is determined by at least one of:
    determining an animation sequence of the visual elements based on a reading order; and
    determining an animation sequence of the visual elements based on sematic tags of the visual elements.

9. A device, comprising:
    a processing unit; and
    a memory coupled to the processing unit and including instructions stored thereon, the instructions, when executed by the processing unit, causing the device to perform acts comprising:
        extracting visual elements of a static infographic, the static infographic being an image described in a graphic design file;
        determining, based on the visual elements, a structure of the static infographic indicating a layout of the visual elements in the static infographic, wherein determining the structure of the static infographic comprises:
            identifying visual elements that are similar to other visual elements;

determining a number of repeating units based on a frequency of repetition of the visual elements;

constructing repeating units based on the determined number of repeating units; and determining the layout of the visual elements in the static infographic based on the constructed repeating units; and applying a dynamic effect to the visual elements based on the structure of the static infographic to generate an animated infographic.

10. The device of claim 9, wherein determining the number of repeating units comprises:

separating the visual elements into a plurality of groups based on similarities between the visual elements; and determining a most frequent number of visual elements in the plurality of groups as a number of the repeating units.

11. The device of claim 9, wherein the layout of the visual elements further comprises:

determining an anchor for a first repeating unit from the repeating units;

selecting a visual element having a similarity above a threshold with the anchor; and adding the selected visual element to the first repeating unit associated with the anchor.

12. A computer program product stored in a computer storage medium and including computer-executable instructions, the computer-executable instructions, when executed by a device, causing the device to perform acts comprising:

extracting visual elements of a static infographic, the static infographic being an image described in a graphic design file;

determining, based on the visual elements, a structure of the static infographic indicating a layout of the visual elements in the static infographic, wherein determining the structure of the static infographic comprises:

identifying visual elements that are similar to other visual elements;

determining a number of repeating units based on a frequency of repetition of the visual elements;

constructing repeating units based on the determined number of repeating units; and determining the layout of the visual elements in the static infographic based on the constructed repeating units; and applying a dynamic effect to the visual elements based on the structure of the static infographic to generate an animated infographic.

13. The computer program product of claim 12, wherein the device further performs acts comprising:

adding to the visual elements semantic tags indicating roles of the visual elements.

14. The computer program product of claim 12, wherein determining the number of repeating units comprises:

separating the visual elements into a plurality of groups based on similarities between the visual elements; and determining a most frequent number of visual elements in the plurality of groups as a number of the repeating units.

15. The computer program product of claim 12, wherein identifying visual elements that are similar to other visual elements comprises:

determining similarity of the visual elements based on at least one of color, layout, and proximity of the visual elements.

16. The computer program product of claim 12, wherein determining the layout of the visual elements further comprises:

determining an anchor for a first repeating unit from the repeating units;

selecting a visual element having a similarity above a threshold with the anchor; and adding the selected visual element to the first repeating unit associated with the anchor.

17. The computer program product of claim 12, wherein determining the layout of the visual elements comprises:

determining the layout based on positions of the repeating units in the static infographic; and determining connectors between the repeating units based on visual elements positioned between the repeating units.

18. The computer program product of claim 12, wherein applying the dynamic effect comprises at least one of:

specifying an animation sequence of the visual elements, the animation sequence indicating a temporal sequence for displaying the visual elements;

specifying staging of the visual elements, the staging indicating how to show the visual elements in a hierarchical way; and applying an animation effect to the visual elements.

19. The computer program product of claim 18, wherein the animation sequence is determined by at least one of:

determining an animation sequence of the visual elements based on a reading order; and determining an animation sequence of the visual elements based on sematic tags of the visual elements.

\* \* \* \* \*